Dec. 25, 1928.

L. KRUPP

POWER OPERATED BRAKE

Filed Nov. 2, 1927

LOUIS KRUPP
INVENTOR

BY *Victor J. Evans*
ATTORNEY

WITNESS:

Dec. 25, 1928.
L. KRUPP
POWER OPERATED BRAKE
Filed Nov. 2, 1927
1,696,851
2 Sheets-Sheet 2
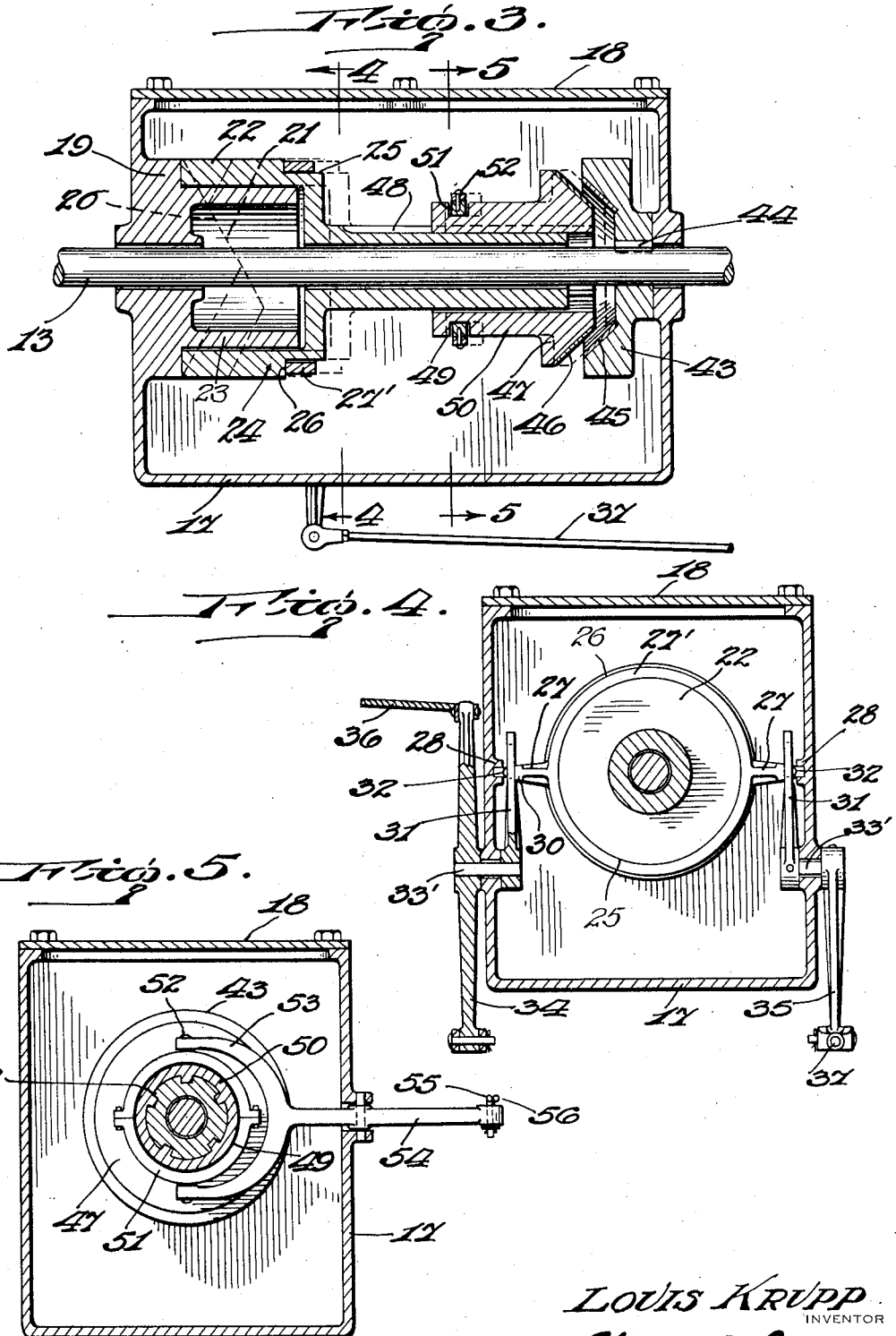

Patented Dec. 25, 1928.

1,696,851

UNITED STATES PATENT OFFICE.

LOUIS KRUPP, OF NEW YORK, N. Y.

POWER-OPERATED BRAKE.

Application filed November 2, 1927. Serial No. 230,627.

This invention relates to power operated brakes for motor vehicles and is an improvement over my invention shown and described in my U. S. Letters Patent Number 1,656,070, dated January 10th, 1928.

The primary object of the invention is to provide a brake device operated by the drive shaft of a motor vehicle, using the brake pedal and hand lever now in use, but eliminating the strain upon the operator of the vehicle when bringing the vehicle to a gradual or sudden stop.

Another object of my invention is to provide a brake device which automatically disengages the clutch of a motor vehicle upon the actuation of either the brake pedal or the hand brake of the vehicle, but permits the actuation of the clutch pedal independently of the brake device.

A further object of the invention is to provide a brake apparatus which will eliminate the emergency brake bands by using the co-acting parts of the apparatus which will stop the drive shaft from turning.

A still further object is to provide a brake device which may be installed upon vehicles now in use without necessitating radical changes in construction to the vehicle, easy to operate and efficient for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 3 is a similar view but taken through the centre along the shaft.

Figure 4 is a vertical transverse sectional view on the line 4—4 of Figure 3.

Figure 5 is a similar view taken on the line 5—5 of Figure 3.

Figure 1:
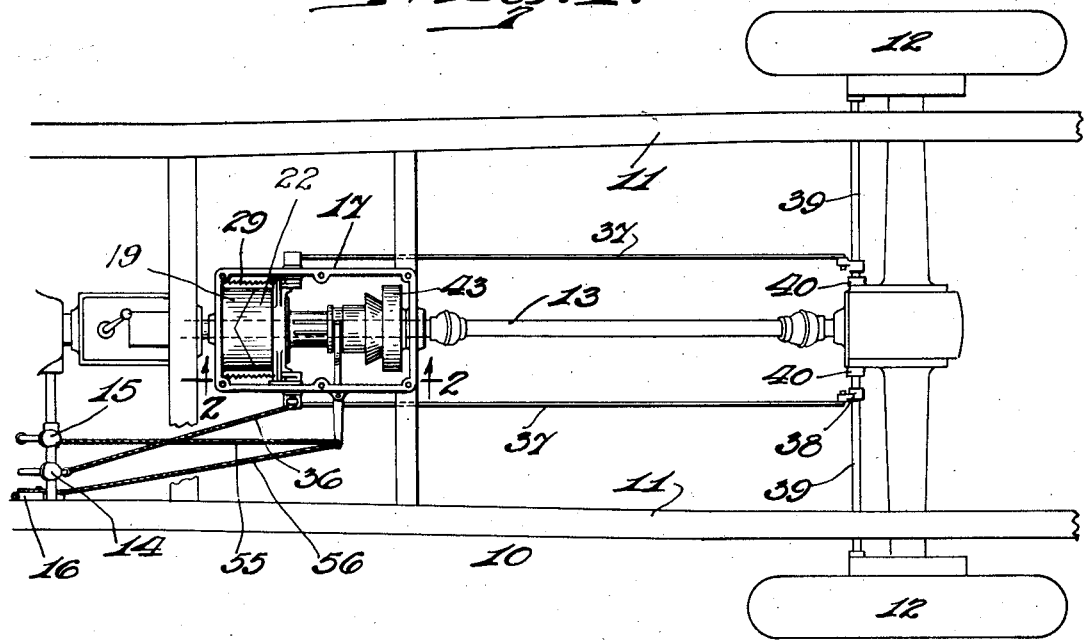
Figure 1 is a top plan view of a chassis of a motor vehicle with my improved brake device applied thereto, with the cover plate removed.
Figure 2:
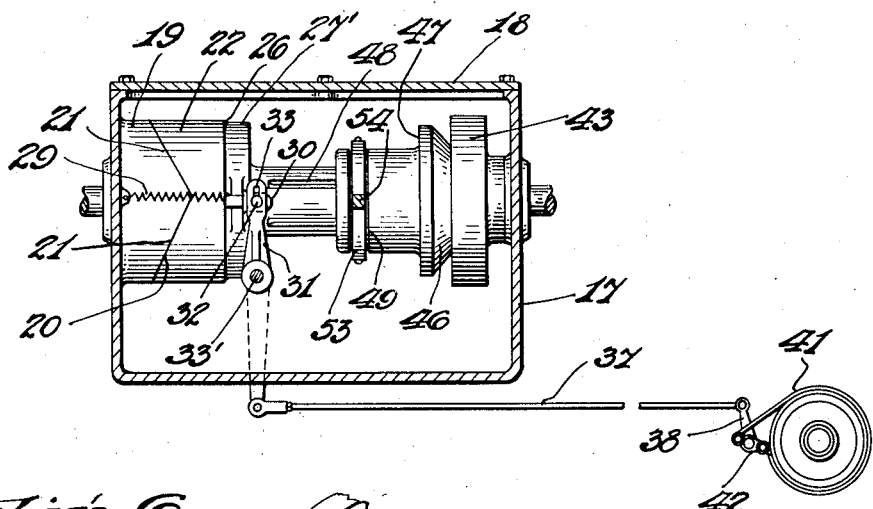
Figure 2 is an enlarged vertical longitudinal sectional view on the line 2—2 of Figure 1.
Figure 6:
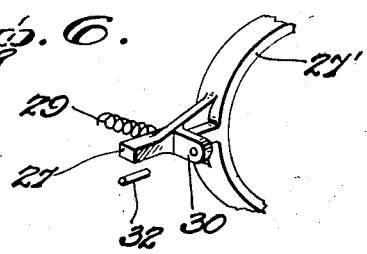
Figure 6 is a fragmentary perspective view of the yoke.

Referring more particularly to the drawings, the reference numeral 10 designates the chassis of a motor vehicle which includes the frame 11, rear wheels 12, a motor driven drive shaft 13, a clutch pedal 14, the brake pedal 15 and a hand brake lever 16.

The drive shaft 13 extends through the housing or casing 17 of my improved braking device, said housing having a removable cover plate 18 bolted thereto. Integral with one end of the housing is a cam element 19 provided with wedge shaped cam surfaces 20 for co-action with similar shaped surface 21 on a rotatable cam element 22. The cam element 19 is provided with a bearing collar 23 to telescopically receive the sleeve 24 of the hollow cam element 22.

The inner peripheral edge of the element 22 is cut away as at 25 to form a shoulder 26 to abut and receive a loosely mounted yoke 27' which is provided with arms 27 that slide in bearings 28 provided in the side walls of the housing. The yoke is held against the shoulder 26 by contractile springs 29 which have their respective ends fixed to said yoke and the adjacent end wall of the casing. Integral with the arms 27 are lugs 30 which are connected to levers 31 by means of pins 32 extending through slots 33 provided in the levers 31 to permit the swinging movement of same. The levers 31 are mounted on stub shafts 33' journalled in the opposed side walls of the housing. Fixed to the other end of the stub shafts which extend outside of the housing are levers 34 and 35. Fastened to one end of the lever 34 is a flexible cable 36 running from the clutch pedal 14. Fastened to the opposite end of lever 34 and the free end of lever 35 are rods 37 which operate the brake bands by means of levers 38 mounted on the inner ends of rocker shafts 39 journalled in brackets 40. The outer end of the rocker shafts 39 are connected to the ends of the brake bands 41 by means of knuckles 42.

To impart movement to the parts just described, I provide a clutch disk 43 keyed to the drive shaft 13 as at 44. The inner face of the disk is provided with a friction lining 45 for co-action with the friction face 46 of a co-acting clutch disk 47 which is slidable along a spline 48 which is formed in the reduced sleeve of the rotating cam element 22. To slide the clutch disk 47 into engagement with the co-acting disk 43, I have provided a groove 49 in the sleeve 50 of the clutch disk 47 which receives a split collar 51 pivoted as at 52 to a yoke 53 of a lever 54 which is journalled in the side wall of the housing. The free end of the lever 54 extends beyond the housing and is operated by a flexible cable 55 having one end connected thereto and its other end fastened to the brake pedal. A flexible cable 56 is also connected to the lever 54 and to the hand brake lever 16.

In operation, the operator of a motor vehicle when desiring to bring the vehicle to a gradual stop, presses upon the pedal 15, which in turn pulls on the flexible cable 55, swinging the lever 54 which slides the clutch disk 47, along the spline 48, into meeting engagement with the clutch disk 43. As the clutch disk 47 moves into engagement with the disk 43, the disk 47 begins to turn due to the fact that the disk 43 is keyed to the drive shaft of the vehicle. The cam element 22 is turned a limited distance which causes the co-acting faces to jam, thereby forcing the cam element 22 rearward or away from the cam element 19, and as the cam element 22 moves longitudinally, the shoulder 26 will abut the side of the yoke 27' which in turn pulls on the rods 37 through the levers 31, stub shaft 33, and levers 34 and 35. During this operation, the upper end of the lever 34, swings rearward pulling on the flexible cable 34 which in turn disengages the clutch of the transmission of the vehicle.

With the clutch of the vehicle being disengaged it will be readily seen that my improved brake device derives its power from the momentum of the vehicle. Should it be desired to bring the car to an abrupt stop the brake lever 16 is manipulated which will enable the operator to get more leverage, therefore the clutch disks of my device are forced together, acting as a brake on the drive shaft while the brake bands on the rear wheels of the vehicle are also put to use in bringing the vehicle to an abrupt stop.

By using flexible cables, the brake pedal, hand lever and the clutch pedal may be used independently of one another.

From the foregoing description, it will be seen that I have provided a brake apparatus for motor vehicles in which a great braking action is provided by a relatively small amount of effort on the part of an operator. The stopping and disengagement of the clutch of the vehicle is controlled by the actuation of either the foot pedal or the hand lever, and it will be appreciated that a braking device of this nature will be found useful on cars when driven in heavy traffic where numerous stops are made.

This invention differs from the construction shown and described in my application above mentioned in that it has particular reference to the manner of construction of the parts and the relation of the same. The clutch members in my improved device are used as a brake upon the drive shaft, operated by the hand lever of a motor vehicle.

The strain of the cam elements is upon the housing of my device, said housing being mounted or fastened to some stationary part of the vehicle, eliminating the strain on the driven shaft.

The standard clutch pedal, foot brakes and hand brake of a vehicle are used and operate my improved device by flexible cables instead of rods allowing each one to be operated independently of the other.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a brake apparatus, the combination with the power shaft of a motor driven vehicle, brake drums, brake bands encircling said brake drums, a brake pedal, a clutch element fixed to said power shaft, a fixedly mounted cam element, a second cam element slidably mounted on said power shaft and normally engaging said first cam element, a second clutch element fixed to said second cam element and slidable longitudinally thereon, actuating means between said brake pedal and said second clutch element whereby depression of said brake pedal will cause said second clutch element to slide into co-acting engagement with said first clutch element for transmitting rotary power to said second cam element for forcing the same longitudinally of said power shaft, and mechanism operable by the sliding movement of said second cam element for contracting said brake bands about said brake drums.

2. In a brake apparatus, the combination with the power shaft of a motor driven vehicle, brake drums, brake bands encircling said brake drums, a clutch pedal, a brake pedal, a clutch element fixed to said power shaft, a fixedly mounted cam element, a second cam element slidably mounted on said power shaft and normally engaging said first cam element, a second clutch element fixed to said second cam element and slidable longitudinally thereon, actuating means between said brake pedal and said second clutch element whereby depression of said brake pedal will cause said second clutch element to slide into co-acting engagement with said first clutch element for transmitting rotary power to said second cam element for forcing the same longitudinally of said power shaft, and mechanism operable by the sliding movement of said second cam element for contracting said brake bands about said brake drums, and clutch operating means simultaneously operable by sliding movement of said second cam element for depressing said clutch pedal.

3. In combination with the drive shaft of a motor vehicle, a clutch member fixed to said shaft, a stationary cam element through which said shaft extends, a second cam element rotatably and slidably mounted on said drive shaft, and normally engaging said first cam element, a second clutch member keyed to turn with said second cam element but slidable with respect to the same and normally out of engagement with said first clutch member, manually operable means for sliding said second clutch member into co-acting engagement with said first clutch member to impart a slight turning movement thereto to cause said second cam element to move longitudinally of said shaft, and brake means operable by the longitudinal movement of said second cam element.

4. In combination with the drive shaft of a motor vehicle, a clutch member fixed to said shaft, a stationary cam element through which said shaft extends, a second cam element rotatably and slidably mounted on said drive shaft, and normally engaging said first cam element, a second clutch member keyed to turn with said second cam element but slidable with respect to the same and normally out of engagement with said first clutch member, manually operable means for sliding said second clutch member into co-acting engagement with said first clutch member to impart a slight turning movement thereto to cause said second cam element to move longitudinally of said shaft, and brake means operable by the longitudinal movement of said second cam element, a motor clutch pedal movable independently of said brake means, and automatic means for operating said clutch pedal upon actuation of said brake means.

5. In a power operated brake apparatus, the combination with the rotatable drive shaft of a motor vehicle, a fixed housing through which said shaft extends, a cam element integral with said housing, a clutch member fixed to said shaft within said housing, a second cam element slidably mounted on said shaft, spring means for normally holding said second cam element in engagement with said first cam element, a second clutch member keyed to said second cam element but slidable with respect thereto and normally held out of co-acting engagement with said first clutch member, manipulative means for moving said second clutch member into engagement with said first clutch member for imparting a slight turning movement to said second cam element to cause the longitudinal movement of the same in a direction away from said first cam element, brake devices, and means for operating said brake devices upon the longitudinal movement of said second cam element.

6. In a power operated brake apparatus, the combination with the rotatable drive shaft of a motor vehicle, a fixed housing through which said shaft extends, a cam element integral with said housing, a clutch member fixed to said shaft within said housing, a second cam element slidably mounted on said shaft, spring means for normally holding said second cam element in engagement with said first cam element, a second clutch member keyed to said second cam element but slidable with respect thereto and normally held out of co-acting engagement with said first clutch member, manipulative means for moving said second clutch member into engagement with said first clutch member for imparting a slight turning movement to said second cam element to cause the longitudinal movement of the same in a direction away from said first cam element, brake devices, and means for operating said brake devices upon the longitudinal movement of said second cam element, a clutch pedal, and means operable by the longitudinal movement of said second cam element for depressing the same to cause the clutch of a motor vehicle to automatically disengage upon the operation of said brake devices.

7. In a power operated brake apparatus, the combination with the rotatable drive shaft of a motor vehicle, a fixed housing through which said shaft extends, a cam element integral with said housing and having a reduced bearing portion, a hollow cam element slidably mounted on said shaft and telescoping said bearing portion of the other cam element, a clutch member fixed to said shaft within said housing, said hollow cam element having a reduced portion to form a shoulder, a slidable yoke engageable with said shoulder, spring means for normally holding said yoke in engagement with said shoulder, a second clutch member keyed to said hollow cam element but slidable with respect thereto and normally held out of co-acting engagement with said first clutch member, manipulative means for moving said second clutch member into engagement with said first clutch member for imparting a slight turning movement to said second cam element to cause the longitudinal movement of the same in a direction away from said first cam element, brake devices, and means for operating said brake devices upon the longitudinal movement of said second cam element, a clutch pedal, and means operable by the longitudinal movement of said second cam element for depressing the same to cause the clutch of a motor vehicle to automatically disengage upon the operation of said brake devices.

In testimony whereof I have affixed my signature.

LOUIS KRUPP.